United States Patent Office 3,098,858
Patented July 23, 1963

3,098,858
7-HALOGENATED ADRENOCHROME
DERIVATIVES
Norman Barsel, Laurelton, N.Y., assignor to Chem Research Company, Laurelton, N.Y., a partnership
No Drawing. Filed June 11, 1962, Ser. No. 201,267
9 Claims. (Cl. 260—295)

The present invention relates to novel 7-halogenated aminochrome oximes, semicarbazones, and hydrazones which are unexpectedly useful as potent hypotensive agents and which are prepared by halogenating the corresponding aminochrome oxime semicarbazone and hydrazone with elemental halogen in liquid inert solvent at or about room temperature.

In the United States Patent No. 2,506,294 of May 2, 1950, there are disclosed certain adrenochrome derivatives such as the hydrazone, the monosemicarbazone, and the oxime, these derivatives unlike adrenochrome being stable and of value for their haemostatic properties. These derivatives of adrenochrome are substantially insoluble in water and their utilization is thereby impaired.

In my U.S. Patent No. 2,581,850 of January 8, 1952, there is disclosed the combination of these derivatives of adrenochrome with, for example, alkali metal salicylates. This combination has a practical solubility in water of about 4–10 mg. per cc. and, therefore, renders a complex such as the adrenochrome monsemicarbazone complex highly useful for the relief of capillary bleeding, since effective doses may be readily administered by injection of a few cc. of solution.

In contradistinction to the utility of the stabilized adrenochrome derivatives of my U.S. Patents Nos. 2,506,294 and 2,581,850 for the control of capillary bleeding, the surprising discovery has been made that the 7-halogenated adrenochrome derivatives with ketonic agents such as the semicarbazone are very potent hypotensive agents whereas adrenochrome semicarbazone has no effect whatsoever on the blood pressure.

Following standard test procedures in animal physiology, a solution of 5 mg. of 7-iodo adrenochrome semicarbazone dissolve in 80 mg. of the sodium salt of 3-hydroxy-2-naphthoic acid per ml. was injected intravenously into normal Sprague Dawley rats. The drop in the blood pressure and the duration of the effect was dependent on the dose. Thus, an injection of 0.05 mg. intravenously produced a pressure drop that lasted 90 seconds till it returned to normal. In contrast, an injection of 0.01 mg. produced a drop of only 3 mm. and lasted 10 seconds.

To compare qualitatively the hypotensive effects of this series of compounds, a Sprague Dawley female rat weighing 375 grams was anesthetized, the internal carotid was cannulated and the compound was given through the jugular vein. The pressure was measured through a double membrane tambour to give the direct arterial pressure. The animal's pressure was allowed to come back to normal before the next dose was administered. In each case 5 mg. of the compound was dissolved in 80 mg. of sodium-3-hydroxy-2-naphthoate per milliliter and 0.1 cc. of such a solution was administered. The pressure was traced on a kymograph.

The following table shows the results obtained for this testing procedure.

TABLE I

| Drug | Dose by Intravenous Administration | Change in Arterial Pressure (in mm. of Hg) | Time for Animals' arterial pressure to return to normal (seconds) |
|---|---|---|---|
| 7-Iodoisonicotinic acid hydrazone of adrenochrome | 0.1 | −20 | 60 |
| Saline Solution | .1 | 0 | 0 |
| 7-Bromo adrenochrome monoxime | .1 | −15 | 70 |
| Isonicotinic acid hydrazone of adrenochrome | .1 | 0 | 0 |
| 7-Bromo adrenochrome semicarbazone | .1 | −15 | 80 |
| Adrenochrome Semicarbazone | .1 | 0 | 0 |
| 7-Iodo adrenochrome semicarbazone | .1 | −15 | 100 |
| Isonicotinic acid hydrazone of aludrinochrome | .1 | −5 | 40 |

The novel 7-halogenated compounds of the present invention which contain a reactive nuclear ketone group in the 5 position reacted with ketonic reagents such as hydrazines semicarbazides and hydroxylamine are illustrated by the following Formula I:

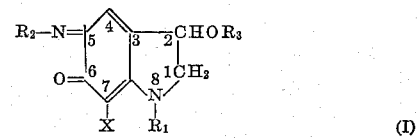

(I)

wherein $R_1$ represents a member selected from the group consisting of hydrogen, methyl, ethyl, isopropyl, normal propyl, normal butyl, and isobutyl radicals; and wherein $NR_2$ represents the nitrogen-containing radical resulting from the reaction of the 5-ketone group of adrenochrome with a nitrogen-containing reagent selected from the group consisting of hydroxylamine, hydrazine, phenylhydrazine, semicarbazide, and isonicotinic acid hydrazine; wherein $R_3$ is a member selected from the group consisting of hydrogen, —$SO_2Na$ and —$SO_2$—K radical and wherein X is a halogen atom selected from the group consisting of chlorine, bromine and iodine.

In the preferred method of the invention, the compounds of the invention having the above formula are prepared by mildly halogenating at temperatures below about 70° C, the hydrazone, semicarbazone or oxime of adrenochrome dissolved in an inert volatile organic solvent, there being employed an excess of elemental halogen selected from the group consisting of chlorine, bromine and iodine whereby halogenation is restricted to the 7 position to make the stable 7-mono-halo adrenochrome derivative having the 5-ketone radical reacted with a nitrogen-containing ketone reactive reagent, e.g., oxime, hydrazone, etc., in the form in which it is safe and effective as a hypotensive agent.

In the case where the adrenochrome compound which is halogenated has $R_3$=—$SO_2Na$ or —$SO_2K$ radical, the starting compound is made by the method shown in U.S. Patent No. 2,835,678 and the ketone derivative is made by the method shown in my U.S. Patent No. 2,506,294.

Suitable volatile, inert organic solvents useful for the mild halogenation in liquid phase include acetic acid, propionic acid, chloroform, methylene chloride, bromoform, carbon tetrachloride, carbon tetrabromide, methylene bromide, ethylene dichloride, etc.

Inert less volatile solvents such as nitrobenzene and chlorobenzene, can be used but are not preferred since they make purification more difficult.

Examples 1 to 4 below show the preparation of typical 7-halogenated aminochrome compounds starting from adrenochrome monoxime, adrenochrome semicarbazone or isonicotinic acid hydrazone of aludrinochrome.

As pointed out in my prior Patent No. 2,506,294, the adrenochrome derivatives with ketonic reagents, e.g., oxime or monosemicarbazone, etc., are such more stable than the parent adrenochrome compound. Halogenation is preferably carried out with these ketone derivatives as the starting material.

The recovery of the 7-halogenated adrenochrome compound from the 7-halogenated adrenochrome ketone derivative is illustrated in Examples 5 and 6 and can be readily effected by hydrolyzing the ketone derivative with alkali, preferably strong alkali, such as NaOH, KOH or $Na_2CO_3$. However, the 7-halogenated compound recovered is unstable even in the form of an acid addition salt. In all instances, the 7-halogenated adrenochrome compound thus formed by hydrolysis is even less stable than the corresponding 7-halogenated ketonic derivative starting compound and this lesser stability is evidenced by a great tendency of the base compound to decompose which defeats its isolation.

It is possible in accordance with the invention to halogenate the adrenochrome base directly. However, the isolation and purification of the 7-halogenated adrenochrome product is so much more difficult, due to its poorer crystalline characteristics, that in the interest of economy of materials, purity of product and reproducibility of method steps involving simple chemical procedures, the preparation of the halogenated ketone derivatives directly by halogenating the adrenochrome ketone compounds is the best method which is known to the applicant.

It is surprising that halogenation of the ketone derivatives does not introduce halogen into the ketone reagent side chain in the 5 position. One would expect, under ordinary illumination using a large excess of halogenating agent in solution at room temperature, that side chain halogenation could occur either at the 5 or 8 positions of the ring and it is surprising to find that the halogen is exclusively directed into the 7 position of the adrenochrome ring structure.

The term "halogen" herein is restricted to chlorine, bromine and iodine.

The following specific examples serve to illustrate but do not limit the present invention.

*Example I*

5 grams of adrenochrome monoxime are dissolved in 50 ml. of warm glacial acetic acid. 10 cc. of bromine in glacial acetic acid is added with stirring and cooling. The temperature was maintained below 60° C. and 100 cc. of water were added whereafter a red precipitate was formed and filtered. The precipitate was washed with water until free of acid and then dried. Almost black crystals that decompose at 158° C. result after recrystallization from hot ethanol. The product was identified as 7-bromo adrenochrome monoxime.

*Example II*

3.27 grams of the isonicotinic hydrazone of aludrinochrome was added while stirring to 1.27 grams of elemental iodine in 100 cc. glacial acetic acid. This mixture was stirred for 30 minutes at room temperature and is filtered to remove any impurities. 300 cc. of diethyl ether added and the red precipitate is filtered. The red precipitate is triturated with methanol, filtered and dried under vacuum. The product decomposes at 142° C. The product was identified as 7-iodo aludrinochrome isonicotinic acid hydrazone.

*Example III*

10 grams of adrenochrome semicarbazone was suspended in 200 cc. of glacial acetic acid and 10 cc. of bromine dissolved in 50 cc. of glacial acetic acid is slowly added with cooling. The red precipitate is filtered and washed free of acid. It is then recrystallized from 50% ethanol. The product decomposes at 190° C. The product was identified as 7-bromo adrenochrome semicarbazone.

*Example IV*

6.35 grams of elemental iodine are dissolved in 500 cc. glacial acetic acid and filtered. 5.90 grams of adrenochrome semicarbazone are added and the mixture is gently stirred for one-half hour. The precipitate is filtered and dissolved in pyridine and filtered. 100 cc. of diethyl ether is added and the red precipitate decomposes at 150° C. The product was identified as 7-iodo adrenochrome semicarbazone.

The compounds shown above in Examples I–IV may also be purified by reacting with a concentrated acid in ethanol form to form and precipitate the salt of the base amine. These amine salts made in Examples V and VI may be used for oral administration in dosages of 0.1–0.5 milligram per kilo for lowering blood pressure in test rats.

*Example V*

½ gram of 7-iodo adrenochrome semicarbazone is reacted with 2 cc. of concentrated hydrochloric acid in 10 ml. of ethanol. To the clear solution is now added 40 ml. of diethyl ether. The resulting yellow precipitate is washed with ether and dried in the desiccator. The product decomposes at 134° C. and is water soluble. The product was identified as 7-iodo adrenochrome semicarbazone hydrochloride and is useful to reduce hypertension when administered at a level of 0.1–0.5 milligram per kilo of animal body weight.

*Example VI*

Using 7-iodo isonicotinic acid hydrazone of aludrinochrome and reacting with nitric acid, a product decomposing at 85° C. is obtained. The product was identified as 7-iodo aludrinochrome isonicotinic acid hydrazone nitrate.

In Examples I–IV there may be used chlorine in acetic acid or in chloroform as the halogenating agent to give the corresponding 7-chloro compound. In this manner, the 7-chloro adrenochrome compound of isonicotinic acid hydrazone was prepared and recovered as the nitrate salt with nitric acid as above.

Summarized below in Table II are some of the compounds of the foregoing examples and their melting points.

TABLE II

| $R_3$ | $R_1$ | $R_2$ | X | Compound | Melting Point, ° C dec. |
|---|---|---|---|---|---|
| H | —$CH_3$ | Semicarbazide | Br | 7-Bromo adrenochrome semicarbazone. | 201 |
| H | —$CH_3$ | Oxime | Br | 7-Bromo adrenochrome monoxime. | 158 |
| H | —$CH_3$ | Isonicotinic acid hydrazone. | I | 7-Iodo isonicotinic acid hydrazone of adrenochrome. | 203 |
| H | —CH(CH$_3$)$_2$ | ----do---- | I | 7-Iodo isonicotinic acid hydrazone of aludrinochrome. | 142 |
| H | —$CH_3$ | Semicarbazide. | I | 7-Iodo adrenochrome semicarbazone. | 150 |

The 7-halogenated adrenochrome compounds of the present invention are relatively non-toxic in effective dosages for treating hypertension and produce a relatively long-lasting hypotensive effect. For example: a .05 mg. dose given to a hypertensive rat, whose initial blood pressure is 180 mm. of Hg, has been found to lower the pressure to 100 mm. and keep it down for over 12 hours.

To illustrate the safety of the present compounds tested for toxicity in the standard test animal, the rat, the $LD_{50}$ value is about 15–20 milligrams per kilogram while the effective dosage varies between 0.01 milligram and 0.1 milligram, effective to maintain the blood pressure at a reduced value of about 55% of that before treatment for a period of about 12 hours.

The effectiveness at the surprisingly low level of administration depends upon the specific ketone residues which are listed in the formula definition of the compounds of the invention. For example, if thiosemicarbazide is used to convert adrenochrome to the corresponding monocarbazone, the resulting compound is too toxic to be safe. If fluorine is used as the halogenating agent, the products are too toxic. The monoketone derivatives are most effective to produce the desired result in lowering the blood pressure of hypertensive animals.

To find that the present 7-halogenated compounds are effective is surprising since the therapeutic agents, such as reserpine, hydrochlorothiazide and chlorothiazide heretofore used to combat hypertension have known disadvantages due to side effects, e.g., diarrhea, anorexia, nausea, headache, etc. The reserpine structure is completely unlike the present compounds. Chlorothiazide and hydrochlorothiazide are based upon an entirely different benzothiadiazine ring, and these latter are used at much higher dosages. To observe the useful activity in the aminochrome nucleus for combatting hypertension is quite unexpected since it has hitherto been thought to exhibit only physiological effects to reduce capillary bleeding.

The 7-halogenated compounds of the present invention are also useful in the form of their acid addition salts. The acid addition salts of the novel compounds of Formula I are stable crystalline salts and are prepared by reacting the basic 7-halogenated compound of Formula I with pharmacologically acceptable inorganic acids such as hydrochloric acid, hydrobromic acid, hydrofluoric acid, hydroiodic acid, sulfuric acid, sulfurous phosphoric acid and nitric acid.

To prepare the acid addition salts, the free base, as prepared, for example, by the method of Examples V and VI, is dissolved 5–15 times its weight of inert anhydrous organic solvent such as methyl alcohol or ethanol and an amount of acid just equivalent to the amount of base is added dissolved in a small amount of the same solvent while stirring and the solution is cooled to 0°–10° C. to precipitate the crystalline addition salt. It is helpful to add 2–3 volumes of diethyl ether. Such strong mineral acids as hydrochloric acid (useful in anhydrous gaseous form by bubbling into the ether solution) and hydrobromic acid form highly crystalline salts.

*Example VII*

This example illustrates formation of an injection dosage of solubilized solution of product of Example I.

To 100 cc. of distilled water there are added 7.5 grams of the sodium salt of 3-hydroxy-2-naphthoic acid, the solution was warmed, stirred and there were then added 0.5 gram of 7-bromoadrenochrome mono oxime as made in Example I. After stirring for ½ hour, a clear solution resulted containing about 5 milligrams of the oxime per cc. This solution was sterilized and loaded into sterile ampoules for injection.

In similar manner, 5 milligrams per cc. dosages were made using 0.5 gram 7-iodo aludrinochrome isonicotinic acid hydrazone for the same amount of 3-hydroxy-2-naphthoic acid, as well as like dosages of 7-bromoadrenochrome semicarbazone and 7-iodo adrenochrome semicarbazone.

The salicylate solution when made by a similar procedure proved to give lower concentrations of halogenated compound, e.g., less than 2 mgm./cc.

1.5 grams of 7-iodo adrenochrome semicarbazone was dissolved while stirring and heating in 1000 cc. of distilled water to which 125 grams of salicylic acid sodium salt are added whereby a clear solution is obtained after 30 minutes stirring the solution containing 1.5 milligrams of the 7-iodo compound per cc.

In similar fashion, a clear solution of other 7-halogenated aminochrome isonicotinic acid hydrazones were prepared in 5 milligrams per cc. dosage utilizing the sodium salt of 3-hydroxy-2-naphthoic acid as the solubilizing salt. The 7-halogen derivatives selected from the foregoing isonicotinic acid hydrazones were the 7-chloro-aludrinochrome compound and the 7-chloro-adrenochrome compound. These 7-chloro-aminochrome compounds were made by the general procedures illustrated in Examples I–IV above, by utilizing the isonicotinic acid hydrazone of the aminochrome as the starting material for halogenation.

*Example VIII*

This example illustrates the formation of an oral dosage of products of the invention which is particularly suitable for administering the inorganic acid addition salts of the 7-halogenated aminochromes; for example, the nitrate, sulfate, hydrochloride or hydrobromide salts which are preferred. The oral administration of these salts at a unit dosage level of 0.1–0.5 milligram is effective to lower the blood pressure in test rats.

The materials which were prepared in tablet form were the following:

(1) 7-iodo isonicotinic acid hydrazone of adrenochrome nitrate.
(2) 7-bromo adrenochrome monoxime hydrobromide.
(3) 7-bromo adrenochrome semicarbazone hydrochloride.
(4) 7-bromo adrenochrome semicarbazone nitrate.
(5) 7-iodo adrenochrome semicarbazone hydrochloride.
(6) 7-iodo adrenochrome semicarbazone nitrate.
(7) 7-iodo isonicotinic acid hydrazone of adrenochrome.
(8) 7-iodo adrenochrome isonicotinic acid hydrazone hydrochloride.
(9) 7-iodo adrenochrome isonicotinic acid hydrazone hydriodide.
(10) 7-chloro adrenochrome isonicotinic acid hydrazone hydrochloride.
(11) 7-chloro adrenochrome isonicotinic acid hydrazone nitrate.

Capsules and pills were made in 0.5 gram bulk by mixing the measured quantities of the foregoing salts with powders and excipients, there being used mixtures of 50% talc and lactose powder in a first group of capsules which were not flavored, and a second group of tablets and capsules was prepared which was flavored with licorice. The tablets were pelleted in a conventional tableting machine. The capsules were loaded into the standard 0.5 gram size soluble gelatin capsule. Blood pressure lowering was observed which was comparable with the results set forth in Table I of the present application.

I claim:

1. A compound selected from the group consisting of 7-halogenated aminochrome of the formula

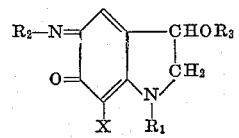

wherein $R_1$ is a member of the group consisting of hydrogen, methyl, ethyl, isopropyl, normal propyl, normal butyl and isobutyl; $R_2$ is a radical selected from the group consisting of —OH, —NH$_2$, —NH C$_6$H$_5$, —NH CONH$_2$ and

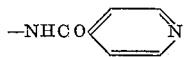

R$_3$ is a member selected from the group consisting of hydrogen, SO$_2$Na and SO$_2$—K and wherein X is a halogen atom selected from the group consisting of chlorine, bromine and iodine and the non-toxic pharmacologically acceptable acid addition salts of said 7-halogenated aminochrome with inorganic acids.

2. 7-iodo isonicotinic acid hydrazone of adrenochrome.
3. 7-bromo adrenochrome monoxime.
4. 7-bromo adrenochrome semicarbazone.
5. 7-iodo adrenochrome semicarbazone.
6. 7-iodo adrenochrome isonicotinic acid hydrazone nitrate.
7. 7-iodo aludrinochrome semicarbazone hydrochloride.
8. 7-chloro adrenochrome isonicotinic acid hydrazone nitrate.
9. A method of making 7-halogenated aminochrome semicarbazones, oximes and hydrazones comprising reacting an aminochrome compound having the 5-keto position reacted with a nitrogen-containing reagent selected from the group consisting of hydroxylamine, hydrazine, phenylhydrazine, semicarbazide and isonicotinic acid hydrazine with an excess of elemental halogen selected from the group consisting of chlorine, bromine and iodine at a temperature below 65° C., while stirring and in the presence of a volatile inert organic solvent, then precipitating the halogenated product from the solution by adding a non-solvent liquid ether to the solution and thereafter separating the halogenated product.

References Cited in the file of this patent
UNITED STATES PATENTS 2,728,772  Barsel _____ Dec. 27, 1955
2,835,678  Swao et al. _____ May 20, 1958

OTHER REFERENCES

Richter et al.: J. Chem. Soc., page 601 (1941).